(12) United States Patent
Laino et al.

(10) Patent No.: US 7,600,893 B2
(45) Date of Patent: Oct. 13, 2009

(54) DISPLAY APPARATUS, METHOD AND LIGHT SOURCE

(75) Inventors: Valerio Laino, Zurich (CH); Lorenzo Occhi, Pfaffikon (CH); Christian Velez, Richterswil (CH)

(73) Assignee: Exalos AG, Schlieren (CH)

( * ) Notice: Subject to any disclaimer, the term of this patent is extended or adjusted under 35 U.S.C. 154(b) by 248 days.

(21) Appl. No.: 11/742,710

(22) Filed: May 1, 2007

(65) Prior Publication Data

US 2008/0272379 A1    Nov. 6, 2008

(51) Int. Cl.
F21V 1/00    (2006.01)
(52) U.S. Cl. ........................ 362/235; 362/293
(58) Field of Classification Search ............. 362/231, 362/293; 359/245; 353/20, 31, 33, 94
See application file for complete search history.

(56) References Cited

U.S. PATENT DOCUMENTS

| | | | |
|---|---|---|---|
| 5,561,679 A * | 10/1996 | Mannik et al. | 372/43.01 |
| 6,648,475 B1 * | 11/2003 | Roddy et al. | 353/31 |
| 6,897,999 B1 * | 5/2005 | Bass et al. | 359/326 |
| 7,159,987 B2 * | 1/2007 | Sakata | 353/31 |
| 2003/0214633 A1 * | 11/2003 | Roddy et al. | 353/31 |
| 2005/0254127 A1 | 11/2005 | Evans et al. | |
| 2006/0270179 A1 * | 11/2006 | Yang | 438/401 |

* cited by examiner

*Primary Examiner*—Ali Alavi
(74) *Attorney, Agent, or Firm*—Rankin, Hill & Clark LLP

(57) ABSTRACT

In accordance with the invention, a display apparatus including a light source is provided, the light source having at least one superluminescent light emitting diode (SLED), the apparatus further having at least one light modulating device arranged in a beam path of a light beam emitted by the light source and operable to emit influenced light upon incidence of the light beam, the light modulating device being operatively connected to an electronic control, the display apparatus further having a projection optics arranged in a beam path of the influenced light.

15 Claims, 4 Drawing Sheets

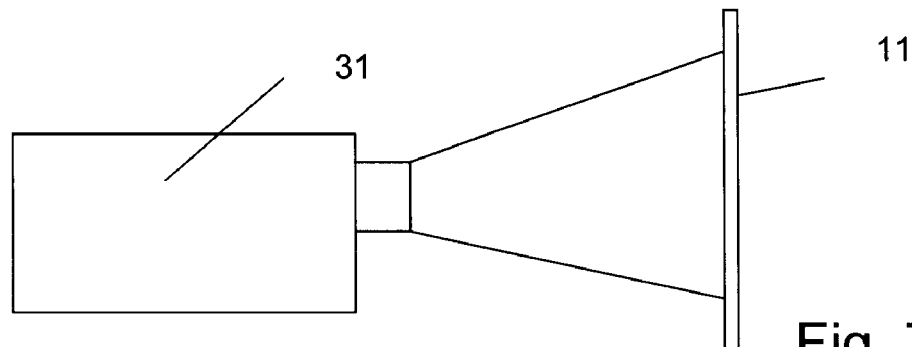
Fig. 7
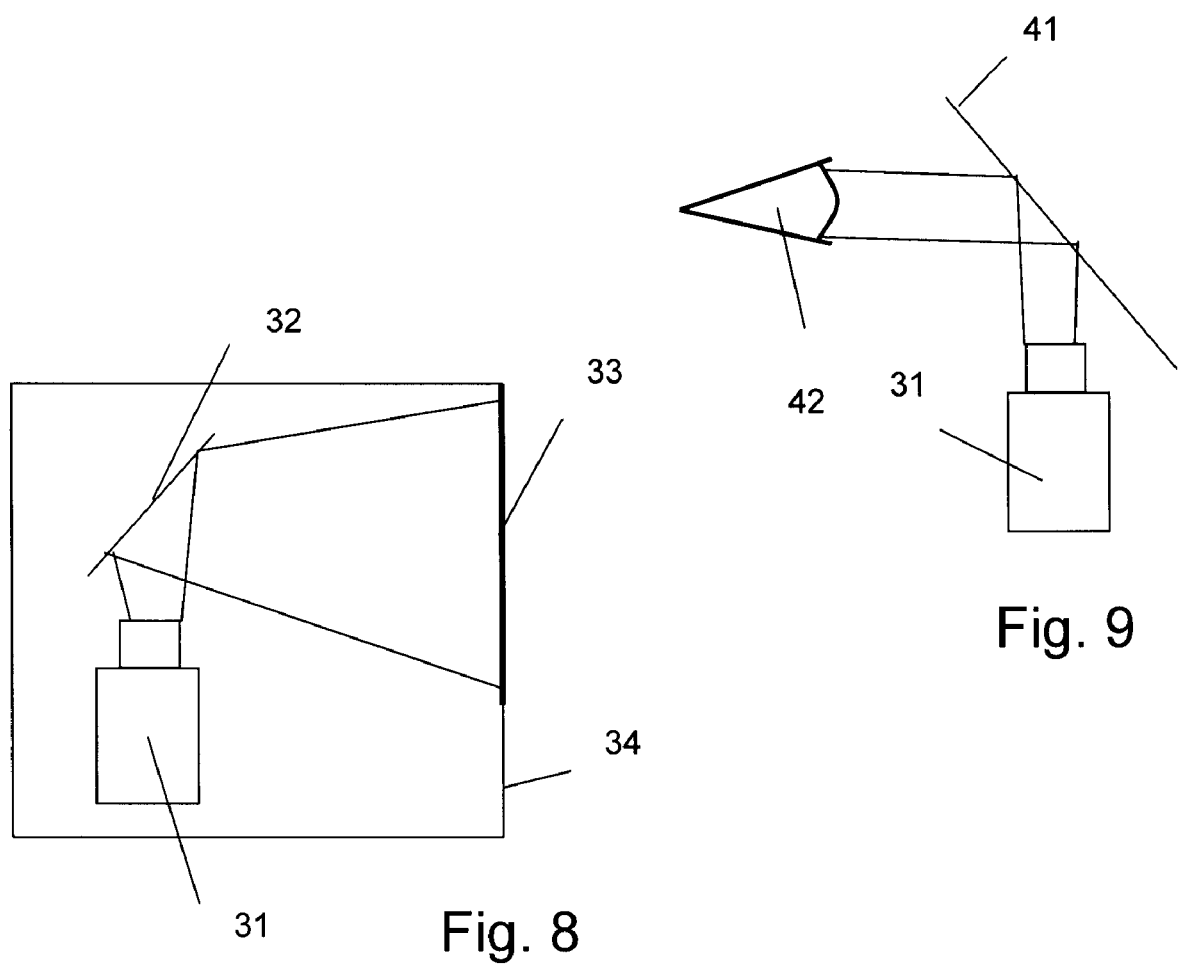
Fig. 8
Fig. 9

DISPLAY APPARATUS, METHOD AND LIGHT SOURCE

BACKGROUND OF THE INVENTION

1. Field of the Invention

The invention is in the field of display systems and concerns a display system with a light source.

2. Description of Related Art

Display systems that include light sources have widespread applications. They include rear projection displays (including screens such as monitor screens and television screens), front projection systems such as LCD, DLP, LCOS (etc.) front projectors, and pocket projectors, head-up displays, etc.

A display system projects an image on a surface (for example a panel) or directly into the human eye. An illumination system generates broadband light suitable to be detected by an appropriate photo-detector to illuminate the environment (for example the human eye). Light sources normally used in projection and display systems are broadband to allow a large color gamut and incoherent to avoid interference between different optical paths that can result in speckle and shadows on the panel. High power level is required at the source to obtain a suitable intensity on the panel, mainly due to the considerable optical loss associated with the projection system. Modern projection display systems include light modulating devices to generate the image from electronic information, like Spatial Light Modulators (SLMs), Micro-Mechanical Systems (MEMS), Liquid Crystal Displays (LCDs), Digital Micro mirror Devices (DMDs), Digital Light Projectors (DLPs), Grating Light Valves (GLVs), and Electrically Switchable Bragg Gratings (ESBGs) among others. All splitting and modulating systems have the purpose to manipulate the intensity of the illuminating beam and generate the image on the panel. This is sometimes referred to as Optically Written Display, as described in U.S. Pat. No. 6,897,999. The overall system efficiency is strongly affected by the coupling between the source and the modulating unit(s) (see: "Projection display throughput: Efficiency of optical transmission and light-source collection", IBM Journal of Research and Development, May-July 1998). Therefore, good beam quality at the light source is required for an efficient energy conversion of the overall system or intensity manipulation.

A typical projection display is made out of the following functional parts:

A broadband light source, such as high power arc lamp;

A filter to remove ultra-violet and infra-red components of the spectra (if required by the source and the rest of the optical system);

Polarizers to polarize the light along one axis (if required by the modulating unit);

A beam splitter, to divide light into the main colors;

One or more light modulating unit(s) defining the intensity of the image in each part;

A beam mixer to recombine the colors and form the white image;

Projection lenses to focus the light on a screen.

Due to the complexity of the optical system, the overall power efficiency is usually very low (see: F. E. Doany et al., IBM Journal of Research and Development, vol. 42, no. 3/4, May/June 1998). The conversion efficiency of a system containing a modulating device is strongly affected by the source-to-modulating unit coupling. Modern projectors use xenon lamps as broadband light sources. The generated light is directed towards the optical system using a parabolic reflector. Despite this, the maximum coupling efficiency between the source and the first lenses is usually around 80%. Moreover, arc lamps are ultra-broadband light sources, meaning that the usable part of the spectra is narrower than the natural emission spectra of the source and a considerable amount of energy is lost filtering both the UV- and IR-components to prevent the damage of some optical parts inside the system. The following table shows the optical transmission efficiency of different steps in state of the art projection systems:

|  | Efficiency |
| --- | --- |
| UV-IR filtering | 0.9 |
| Illumination | 0.85 |
| Polarization | 0.38 |
| Prism and Filter | 0.7 |
| Projection Lens | 0.9 |
| SLM | 0.6 |
| Total | 0.1 |

Some modulating devices are sensitive only to one polarization, as, for example, first generation LCD. Therefore, in these systems a considerable amount of the energy is also lost in the polarizer. Today, many displays use the Digital Light Processor (DLP), consisting of a composite mirror where each element can switch on and off very fast to change the light intensity in each part of the image. This modulating device is insensitive to the light polarization and gives better efficiency compared to polarization dependent modulating units (see: Lars A. Yoder, "An Introduction to the Digital Light Processing (DLP™) Technology", Texas Instruments white paper).

For such display systems, various light sources are on the market, including:

incandescent bulbs;

gas discharge lamps;

xenon lamps;

cathode-ray tubes;

ultra-high pressure (UHP) lamps.

Today incandescent bulbs and gas discharge lamps are typically used for illumination systems only. Incandescent bulbs also do not feature extremely long lifetime figures, but the low cost of each item keeps the total cost very affordable. However, the low conversion efficiency pushed some countries to ban light bulbs in aim to help cut greenhouse gas emissions. Gas discharge lamps are more beneficial in that respect but suffer from the drawbacks of limited luminance and limited spectral width.

For projection systems, however, due to the mentioned low overall power efficiency, only high-power lamps are suitable. Usually, high-power xenon lamps are employed in projection display systems to ensure suitable light intensity on the display panel. While bulbs are cheap, the cost of a xenon lamp is very high so that it contributes to a considerable fraction to the cost of the whole system. Lifetime of the light source is another issue. Typically, the xenon lamps have lifetime figures of approximately 3000 hours and even if they do not fail immediately after that time, the quality of the imaged formed on the display is reduced with time.

More in general, all the light sources commonly found in image projection or illumination systems have some well-established characteristics:

high optical power, to allow the illumination of a large area;

low energy conversion figures, meaning considerable residual heat generated to produce the required amount of light;

incoherent time evolution of the electromagnetic radiation, to avoid any interference between different optical path that can result in fringes or speckle in the image formed on the panel or the illuminated surface;

broadband emission spectra to cover the whole spectral response of the photo detector used (for example of the human eye);

beam characteristics not suitable to ensure good coupling with the other optical elements, forcing the manufacturers to use lenses, mirrors, parabolic deflectors and other optical elements to ensure directionality of the beam and good coupling with other optical elements;

reliability and lifetime issues.

BRIEF SUMMARY OF THE INVENTION

It is an object of the present invention to provide a display apparatus that overcomes drawbacks of prior art display apparatuses. It is a further object of the invention to provide a display apparatus having a light source with an enhanced reliability. It is yet another object to provide a display apparatus having a light source with an enhanced lifetime compared to prior art display apparatuses. Yet a further object of the invention is to provide a display apparatus with an enhanced overall (out-of-the-plug) efficiency. Another object of the invention is to provide a display apparatus with a broad gamut light source. A further object is to provide a display apparatus with a small form factor and/or a simpler set-up. Also, an object of the invention is to provide an improved method of displaying information. Finally, an even further object is to provide a light source for a display apparatus.

In accordance with the invention, a display apparatus including a light source is provided, said light source including at least one superluminescent light emitting diode (SLED), the apparatus further comprising at least one light modulating device arranged in a beam path of a light beam emitted by said light source and operable to emit influenced light upon incidence of said light beam, the light modulating device being operatively connected to an electronic control, the display apparatus further comprising a projection optics arranged in a beam path of the influenced light.

Superluminescent light emitting diodes (SLEDs) are optoelectronic devices generating light by way of amplified spontaneous emission. This means that the spontaneously-emitted photons are amplified by means of stimulated emission inside a waveguide and directed towards an aperture. SLEDs are usually considered a hybrid between laser and led devices.

The light modulating device is a device that influences the average intensity of light forwarded in a particular direction, as a function of time, for example, by absorption or by deflection. By this, a desired image is generated. The light modulating device, therefore, is an active, electronically controlled device.

In accordance with a first embodiment, the display apparatus may be monochromatic, and the light source may comprise only one SLED or one group of SLEDs with essentially identical emission spectra.

The light source may, according to an alternative, preferred embodiment, include a plurality of SLED devices or groups of SLED devices, each SLED device or group of SLED devices having emission spectra with different center wavelengths. The term "center wavelength" does not imply that the emission spectrum necessarily has any particular symmetry or that it necessarily is contiguous, but rather refers to a middle wavelength.

For example at least one red, green, and blue SLED may be present. The SLEDs of the light source may at least partially be physically grouped together or may be physically located at different places and not be connected together (except, for example, by being mounted in a common casing of the apparatus or of a light source sub-unit of it.).

In the case of such a multicolor display apparatus (this term refers to a display apparatus that is capable of displaying images of at least two colors), the apparatus may include a single light modulating unit. The light portions originating from different color SLEDs are then all projected onto the same light modulating unit area. In this design the SLEDs and the light modulating device can be operated in time-division multiplexing to avoid the need of more than one light-modulating unit while being able to display a colored image, so that arbitrary color impressions can be generated on the display surface. This is because for a high enough frequency the eyes does not see a "jump" in the image because of the retina-persistent image.

By such an approach, one can save on the number of light-modulating units. The possibility of providing such an approach is an even further advantage of the apparatus according to the invention, as SLED light sources can, in contrast to high power gas lasers, light bulbs or xenon lamps, be switched on and off very fast. The missing ability to switch on and off fast is one of the reasons forcing state of the art systems to have a beam splitter and beam combiner.

A time-swapped operation of the SLEDs can either be achieved by switching the SLEDs on and off in a manner synchronized with the light modulation device operation, or by an appropriate light blocker or re-director allowing the light emitted by an SLED to reach the modulating device during at the appropriate intervals only. Such a light blocker or re-director may, for example, include a rotating, partially blackened wheel, a rotating mirror, or a MEMS operated mirror etc.

If the light beams of the different SLEDs are directed on the same light-modulating device and the sources activated alternatively in time, there is no need for beam splitters, and energy can be saved, if only one source is active at a time.

As an alternative to the time-division multiplexing operation, the display apparatus may comprise a plurality of light modulating units, preferably one per color. Light from the different color SLEDs then impinges on the associated light modulating units and from there is projected onto the display object. The corresponding projection optics may then include means for uniting the different light proportions in an image such as (reversedly operated) beam splitters etc.

In accordance with the above, the approach according to the invention provides the possibility of obtaining desired colors without any need to start from white light by at least one of the following means:

1. The light proportions of different wavelengths impinge on the light modulating device at different times.

2. The light paths of the light proportions of different wavelengths are different (not interleaved) upstream of the light modulating device and are only interleaved downstream of the light modulating device.

In any case, the spectrum of the light incident on a light modulating unit corresponds to only a fraction of the full spectrum of the image to be generated. The light emitted by different emission spectra SLEDs is preferably not combined to provide white light. The light incident on a light modulating device/unit may also be viewed as "monochromatic", where "monochromatic" in this context characterizes the light spectrum of light emitted by a single SLED, which is relatively broad compared to the light spectrum emitted by a corresponding semiconductor laser. The light incident on a light modulating device/unit is preferably light having a spectrum corresponding to the light spectrum of the light directly emitted by the SLED, i.e. often no cut-off of frequency ranges from the primary light output by the SLEDs is necessary.

The light modulating device (or units thereof) is, for example, such that the full image is produced on a small scale, and the projection optics magnifies the image and projects it to the desired location. The full image produced on a small scale on an appropriate light modulating unit area is sometimes referred to as pre-image in this text. In the embodiment including a plurality of light modulating units, preferably each one of for example three units generates a full pre-image, and the three images of the three units (such as corresponding to blue, green, and red) are projected to a same image area.

In any case, the light modulating device or unit thereof creates a pre-image that is either imaged onto the full image or at least a large fraction thereof of for example at least $1/10$, for example $1/2$) thereof. This is in contrast to hypothetical systems without any light-modulating device where a large number of light sources is present, each creating a small part (such as a pixel) of the image to be generated.

Between the SLED devices and the modulating device and between the modulating device and the projection object, the apparatus preferably includes optical elements. Light emitted by the SLEDs is preferably collimated. To improve the illumination homogeneity, the light modulating device/unit may be illuminated by a beam having a larger area than the light-modulating device/unit itself so that the device/unit sits more or less where the beam intensity maximum is. To shape the beam in such a case and to thereby improve the illumination homogeneity on the modulating device/unit and consequently on the panel, astigmatism-correction lenses could be used. In addition or as an alternative, homogeneous illumination correcting the primary light intensity may be brought about by an intensity filter.

Pre-images created by the light modulating device are imaged onto the projection object. Ways of doing such an imaging are known to the skilled person, and the various ways of doing so are not investigated any further here.

The approach according to the invention combining SLED light sources with a light modulating device features important advantages over prior art displays.

Today semiconductor technology allows the production of visible electromagnetic radiation that can be used in image and display systems. State of the art semiconductor-based light sources can be classified in two main categories:

light emitting diodes (leds), having a broad energy spectrum and incoherent light; since light is not guided, coupling into an external optical element is poor;

light amplifiers by means of stimulated emission of radiation (lasers), having a narrow spectrum and highly coherent light beam; a narrow waveguide confines the electromagnetic radiation resulting in good in-fiber coupling of the light, i.e. high spatial coherence.

Broadly speaking semiconductor light sources offer a much longer lifetime compared to conventional lamps, smaller form factor and better energy conversion efficiency, suggesting a lower power bill. Moreover, systems using multiple semiconductor light sources emitting in the visible spectrum promise an expanded color gamut to improve the user experience. Nevertheless, semiconductor light sources have been considered for display apparatuses only in special cases, due to severe drawbacks: leds on the one hand offer a small optical output power only. To overcome this problem, the emitting area is usually enlarged, increasing the surface of the device. This results in problems with collimating the emitted light beam, and the beam quality deteriorates with the die size. Therefore, light cannot be efficiently coupled to a light-modulating unit. Optical output power is another concern. The current state-of-the-art of high brightness led suggests that a device pushing 1,000 lumen out at the lens is not foreseeable for the next 4-5 years. This means that especially high output power projection devices will not be realizable using led light sources.

Laser diodes, on the other hand, offer high power, compact design, good energy conversion into light and good coupling efficiency to external optical systems, i.e. high spatial coherence. The high temporal coherence of light output by laser diodes, however, brings about the severe disadvantage of speckles. Speckle is an interference effect caused by interaction between scattering centers in the projection screen. This is a significant problem, especially in rear projection system where the small pupil of the projection lens introduces enough coherence into the projected image, causing speckle even with incoherent light sources such as xenon lamps. Modern rear projection screens are designed to minimize this effect, however they cannot completely remove it. Coherent light sources, such as lasers, render speckle unacceptable. To avoid this, complicate depolarization systems are used in projection systems, considerably reducing the overall efficiency of the device. To reduce speckle, the following methods have been proposed: (1) control of spatial coherence, (2) control of temporal coherence, (3) spatial sampling, (4) spatial averaging, and (5) screen design. Spatial sampling and averaging reduces the resolution of the display and cannot be accepted for high-resolution displays. Other means of reducing temporal coherence such as light tunnels are complicated, require a lot of parts and bring about a considerable loss in light intensity.

A further disadvantage of laser diodes as light sources for multicolor displays is the perceived color quality. In principle, to generate any color, one just has to combine three laser sources emitting red, green, and blue light. This is what is normally done in laser display apparatus. However, although the resulting image appears to be properly colored, most persons would find it different from the image generated using a display system with filament lamps, such as xenon lamps. Broadband light sources, such as the xenon lamp, are more suitable to produce colors that users like, probably because the spectrum emitted better resembles the black-body spectrum. Even when more sources are used, discontinuities in the spectrum are harmful for the image quality.

Yet another obstacle in using laser diodes in projection systems is given by polarization of the photon emitted by this device. Even if in laser diodes the active cavity can be designed to generate both p- and s-polarized photons, one polarization will be dominant during device operation due to the feedback of the active cavity. The other polarization will be always be present, however with power level several dB lower. This is not a problem for light modulating devices such as the first generation of LCD where polarized incident light actually is an advantage. However, today most of the light-modulating units are polarization insensitive. Therefore, optical depolarizers or even two devices must be used in laser display systems.

SLED devices overcome the drawbacks of both led and laser light sources. SLED devices use the stimulated emission to amplify the spontaneously emitted photons, to achieve more power than normal leds. This allows for reaching higher power levels than conventional led, keeping safe the compact form factor of laser diodes.

SLED devices, further, offer a very low temporal coherence due to their emitted large optical spectral bandwidth. This quality allows for overcoming all the problems associated with speckle outlined before. Further, like semiconductor lasers a SLED may come about with a narrow-stripe waveguide. As the light propagates within a waveguide inside the SLED, the output beam may be nearly diffraction limited, meaning that the beam is spatially coherent and can therefore be better coupled to an external optical system, such as lenses and eventually light-modulating devices. This is generally referred to as high entendue matching between the source and the optics system and is the main limiting factor that prevents the efficient use of led in display systems.

Also, SLED devices can be designed to have the same power for both p- and s-polarization, meaning a polarization independent light source. Therefore, SLED devices can be used in conjunction with polarization insensitive light-modulating devices, such as DLPs without any need for depolarizers.

Moreover, SLEDs also have a small form factor (compared to xenon lamps or similar light sources, especially if the sophisticated optics required to split the light into the different color light portions and to re-unite them) and a lower power consumption, as well as an expanded color gamut.

Finally, SLEDs feature a broad spectral emission (compared to lasers): this allows coverage of only the needed portion of the electromagnetic spectrum and eliminating the need for any filtering of the UV- and IR-components, increasing the overall power efficiency and reducing the complexity of the system. Also, the visible part of the electromagnetic spectrum may be covered by a very limited number of different SLEDS, for example SLEDs emitting in the three primary colors red, green, and blue. The light sources could be chosen to improve the perceived quality of the colors.

An apparatus according to the invention can be designed as any apparatus providing sharp and high quality images. These include but are not limited to:
    rear projection displays, as they offer good energy conversion figures;
    front projection systems, where the residual generated heat is minimized and the system lifetime is improved due to the increased lifetime of the light generating devices;
    pocket projectors, where the reduced form factor allows for keeping the overall design compact;
    integrated displays, where both the form factor and the energy conversion are crucial factors;
    head up displays, where sharpness of the image is essential also due to the vicinity of the formed image with the eye, and others.

As SLED devices are similar in beam shape to conventional laser devices, they can even be used in display vectorial systems, such as 0-dimensional flying spot scanners and 1-D linear arrays for which high spatial coherence is required. The apparatus according to the invention can be used also in 2-D microdisplay based projectors as the beam quality allows good entendue matching.

The system does not need any polarizer or light tunnel to avoid speckle, as it's not required by the light sources, and preferably the light path from the light source to the display object comprises, apart from the modulation device, only re-directing means such as mirrors, lenses, prisms etc. and no means cutting of a part of the light intensity. In addition, no beam splitter or UV- and IR-filters are required as the sleds are designed to cover only the needed part of the optical spectrum.

The invention also concerns a light source for a display apparatus, the light source including:
    a first superluminescent light emitting diode including
        a first semiconductor heterostructure forming a PN junction
        and a first waveguide defining an optical beam path,
    the heterostructure including a gain region and a contact for applying a voltage to the PN junction in the in the gain region, so as to produce light emission from the gain region and along the optical beam path,
    the first superluminescent light emitting diode having a first emission spectrum a central wavelength of which is in the visible part of the optical spectrum,
    the light source further including a second superluminescent light emitting diode including
        a second semiconductor heterostructure forming a PN junction and a second waveguide defining an optical beam path,
    the second heterostructure including a gain region and a contact for applying a voltage to the PN junction in the gain region, so as to produce light emission from the gain region and along the optical beam path,
    the second superluminescent light emitting diode having a second emission spectrum a central wavelength of which is in the visible part of the optical spectrum,
    the second emission spectrum being different from the first emission spectrum.

Especially, the light source may include at least three superluminescent light emitting diodes emitting red, green, and blue light, respectively. The light source may also include more than one SLED per center wavelength ("per color") such as two red, two green and two blue SLEDs, or more of each; the number of SLED per color does not need to be equal for all colors but may differ. For example, if a red SLED has a higher output power than a blue SLED, the light source may comprise more blue SLEDs than red SLEDs.

The invention, in addition, concerns a method of displaying an image, the method including the steps of:
    Providing a semiconductor heterostructure with a waveguide;
    Causing the semiconductor heterostructure to emit visible light and to amplify the visible light by stimulated emission, thereby creating a primary light beam in the waveguide;
    Causing the light beam to be radiated away from the semiconductor heterostructure without any substantial light beam portions being fed back to the semiconductor heterostructure;
    Modulating the light beam to yield a pre-image; and
    Imaging the pre-image onto a full area of the image.

"No substantial light beam portions" means that potential residual light emitted back into the heterostructure by reflection or in other ways is not sufficient to cause the heterostructure to lase in a predominant manner, i.e. the heterostructure does not form an optical resonator with light circulating back and forth.

BRIEF DESCRIPTION OF THE DRAWINGS

The foregoing and other features and advantages of the invention will be further described in the following more particular description of preferred embodiments of the invention as illustrated in the accompanying drawings. The drawings are all schematic and not to scale. In the drawings, same reference numerals refer to same or corresponding elements.

FIG. 7 displays the principle of a front projection display;

FIG. 8 depicts the principle of a rear projection display; and

FIG. 9 shows a head-up display.

DETAILED DESCRIPTION OF THE INVENTION

Figure 1:
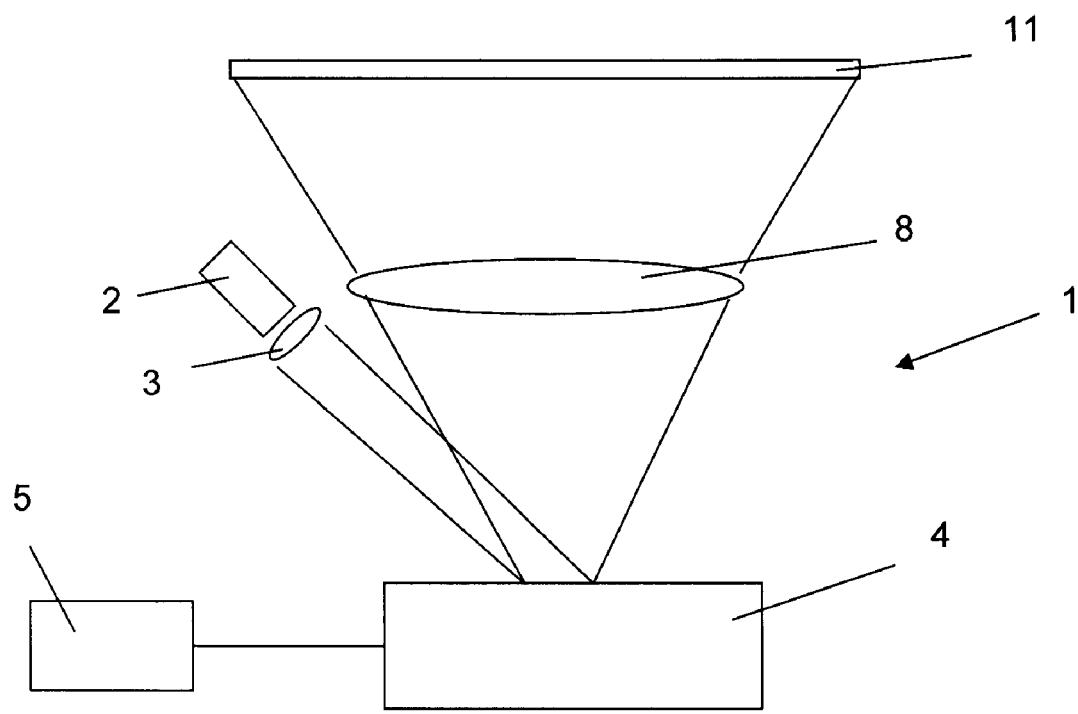
FIG. 1 depicts a first embodiment of the invention corresponding to a monochromatic display.

The display system shown in FIG. 1 includes a display apparatus 1 and a projection object having a display surface. In the shown embodiment, the projection object is a very schematically depicted screen 11 or panel.

The display apparatus 1 comprises a light source and a collimating optics 3. The light source includes a superluminescent light emitting diode 2.

Superluminescent light emitting diodes as such are known in the art. They rely on the principle that in a gain medium, population inversion is maintained by pumping and that due to this, spontaneously emitted radiation is amplified by stimulated emission. The radiation in the superluminescent light emitting diode may be guided by wave guiding means. In contrast to a laser, however, emitted radiation coming from the gain medium is not re-circulated to again enter the gain medium, thus, the gain medium is not in an optical resonator beam path. International patent application publication WO 2005/071 762, incorporated herein by reference, contains a discussion of possible means for preventing an SLED device from lasing, as well as a novel means for doing so.

The superluminescent light emitting diode (SLED) 2, in contrast to most prior art superluminescent light emitting diodes, emits visible light. For example, the SLED 2 may emit red or green or blue light. If blue light is to be emitted, the SLED contains a heterojunction of a GaN (or, to be more precise, $In_xGa_{1-x}N$ with x between 0.05 and 0.2 for blue light—similar to the according value for blue lasers semiconductor material—and for green light a heterojunction of $In_xGa_{1-x}N$ with x between 0.2 and 0.3, and for example $Ga_{1-x}In_xP$ with x≅0.52 for red light. Other material systems suitable for generating, by the principle of stimulated emission, visible light are possible.

In a variant, the electromagnetic radiation emitted by the SLED is frequency converted, thus in such a variant, the light source next to at least one SLED also contains a frequency converter, for example a dye. Often, however, it is preferred to modulate the light directly emitted by the semiconductor device, thus the SLED.

The (optionally collimated) light emitted by the SLED light source impinges on a light modulating device 4. Such a light modulating device may be based on a technology known for modulating incident light for the purpose of providing an image to be displayed. For example, the light modulating device may be based on the principle known as digital light processing, which principle, for example, relies on a mechanism sometimes referred to as Digital Micro Mirror Device (DMD) mechanism, i.e. light modulation by a plurality of small mirrors the orientation and/or position of which may be controlled. The light-modulating device may as an alternative be based on another MEMS based mechanism such as Grating Light Valves or other. As yet other alternatives, the light modulating device may rely on the principle of Liquid Crystal Displays (LCDs) or on the principle of Electrically Switchable Bragg Gratings (ESBGs) or on another light modulation principle. The light modulating device may be of a reflection type—as illustrated in FIG. 1 or may be of a transmission type (for example if it is based on the LCD principle).

The light modulation device comprises an electronic control 5 schematically depicted in FIG. 1. The electronic control or parts thereof may optionally be integrated with the light modulation device 4 in a single unit such as a chip, or it may be separate therefrom.

The modulated light is directed to the projection surface by a projection optics 8, the projection optics preferably being a part of the display apparatus and for example—but not necessarily—being integrated with the other display apparatus components in a single casing.

Although a monochromatic display as illustrated in FIG. 1 lies within the scope of the invention, some advantages of the invention become most apparent for colored (i.e. multicolor) displays.

Figure 2:
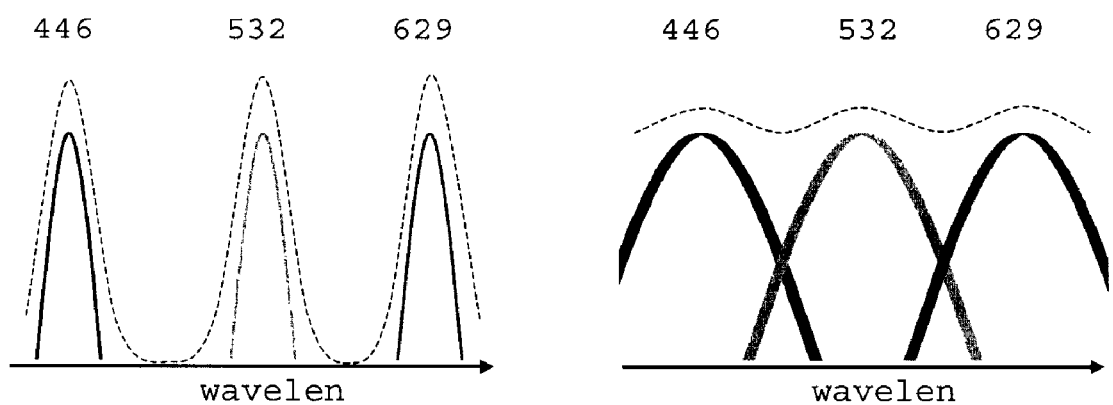
FIG. 2 shows spectra multiple light sources in a laser display system and a system according to the invention.

FIG. 2 illustrates in the left panel the spectra of a blue, a green and a red laser. As can be seen, the addition of the three spectra does not provide a complete coverage of the visible range but leaves gaps between the spectra of the three laser types.

The light emitted by the three laser sources may in principle be combined to generate white and any colored light. With this technique, it is ideally possible to complete the whole color gamut. This is what is normally done in laser display apparatus. Although the resulting image appears to be properly colored, most persons, however, would find it different from the image generated using a display system with filament lamps, such as xenon lamps.

Therefore, even though in principle all colors can be mixed by superposition of the contributions of the three lasers, the colors—and especially white light resulting from the mixture of all three colors—are perceived as not ideal. Rather, broadband light sources such as Xenon lamps have been observed to be more suitable to produce colors that users like, probably because the spectrum better resembles the black body spectrum.

Differently from lasers, sled devices are broadband light source, meaning that each single source can generate light over a large spectral range. Despite this, a SLED does not cover a spectrum as wide as the human eye can perceive, therefore is not a single source light generating device as a filament lamp. However, it is possible to design a system containing more than one SLED, with partially overlapping spectra that ensure an overall shape more similar to the backbody, as shown in the right panel in FIG. 2. As can be seen, the spectra of blue, green and red SLED light overlap in contrast to the according narrower bandwidth laser light. Therefore, blackbody radiation can be approximated by the superposition of the light emitted by three SLEDs much better than for lasers. Such an overlap is not feasible using laser devices, as it would require too many separate lasers.

However, the spectrum of a SLED is still narrow and well-defined enough for the number and spectral properties of the sled devices to be designed to have energy emitted only in the wavelength range suitable for human vision. This allows sparing UV and IR-filters required in conjunction with xenon lamps and improves the overall energy conversion efficiency of the system.

Figure 3:
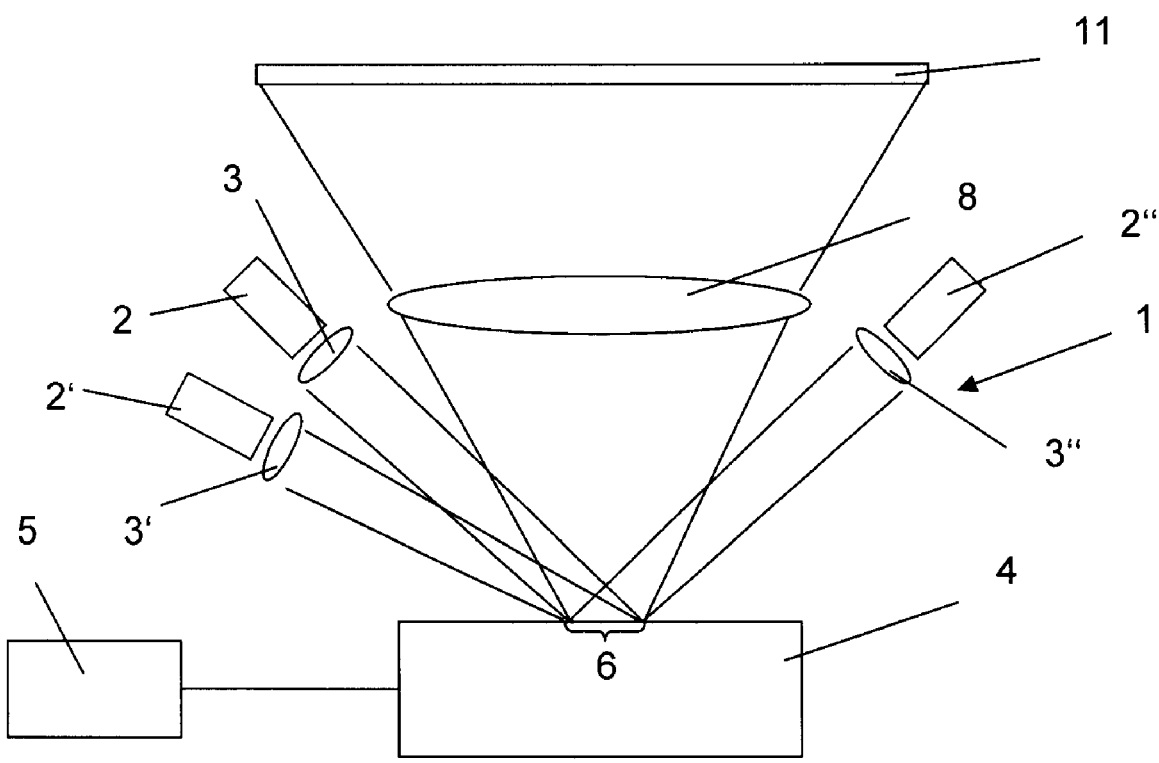
FIG. 3 depicts an embodiment of the invention corresponding to a colored display.

A first example of a multicolor display apparatus 1 according to the invention is illustrated in FIG. 3. The light source comprises three SLED devices 2, 2', 2" for the colors red, green, and blue. The active region of the SLED devices may comprise the semiconductor material compositions mentioned above. Through collimation optics 3, 3', 3" the light emitted by the SLEDs projected on the light modulating device 4. The light with the image information in it prepared by the modulation device is then focused on the display surface 11 to be illuminated.

The light modulating device in accordance with the design as shown in FIG. 3 features only one light modulating unit (thus only one unit that creates a pre-image to be imaged onto the display surface). The light portions originating from the plurality of SLEDs are all projected onto the same light modulating unit area 6. Therefore, in this design the SLEDs and the light-modulating device have to be operated in time-division multiplexing with a sufficient swapping frequency of, for example, at least 200 Hz so that arbitrary color impressions can be generated on the display surface.

Figure 4:
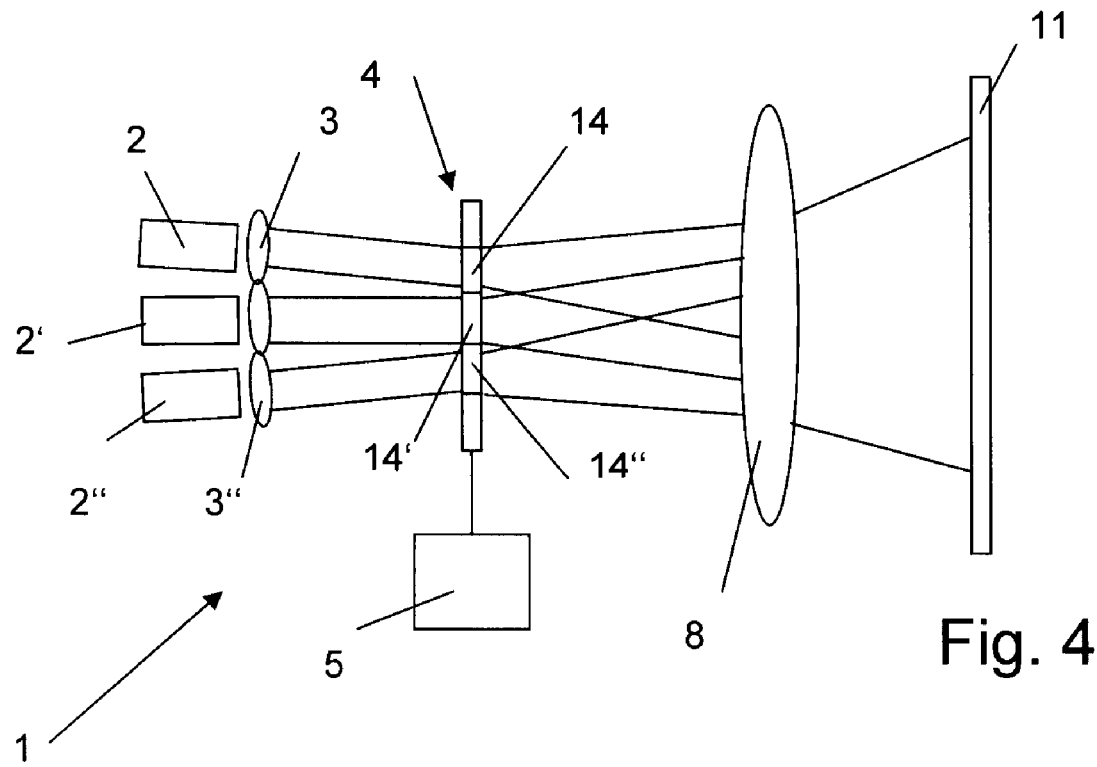
FIG. 4 shows an alternative embodiment of a colored display.

The light modulating device 4 shown in FIG. 4 is also of the reflection type, but, as for the above-shown embodiment, the concept would also work for transmission type light modulating devices.

The multicolor display apparatus 1 according to FIG. 4 comprises a light modulating device of the transmission type, i.e. the light modulating device comprises at least one unit through which light is transmitted and thereby modulated to provide a pre-image. More concretely, the light modulating device 4 of the multicolor display apparatus comprises a plurality of transmission type light modulating units 14, 14', 14". The light modulating units may for example be liquid crystal display (LCD) units of the type that as such is known in the art. The number of light modulating units corresponds to the number of colors provided by SLED devices of the light source (for example three for the colors red, green and blue), and, since preferably exactly one SLED device or group of SLED devices is present per color, in the shown embodiment also corresponds to the number of SLED devices 2, 2', 2". The projection optics 8 in the shown embodiment has the additional functionality (in addition to imaging the pre-images onto the display surface) of uniting the light proportions originating from the different SLED devices. This may for example be done by an appropriate arrangement of beam splitters (not shown).

For all embodiments of the present invention, it would also be possible to provide more than one SLED device per color; the light source would then comprise at least one group of a plurality of SLED devices with the same emission spectra.

Figure 5:
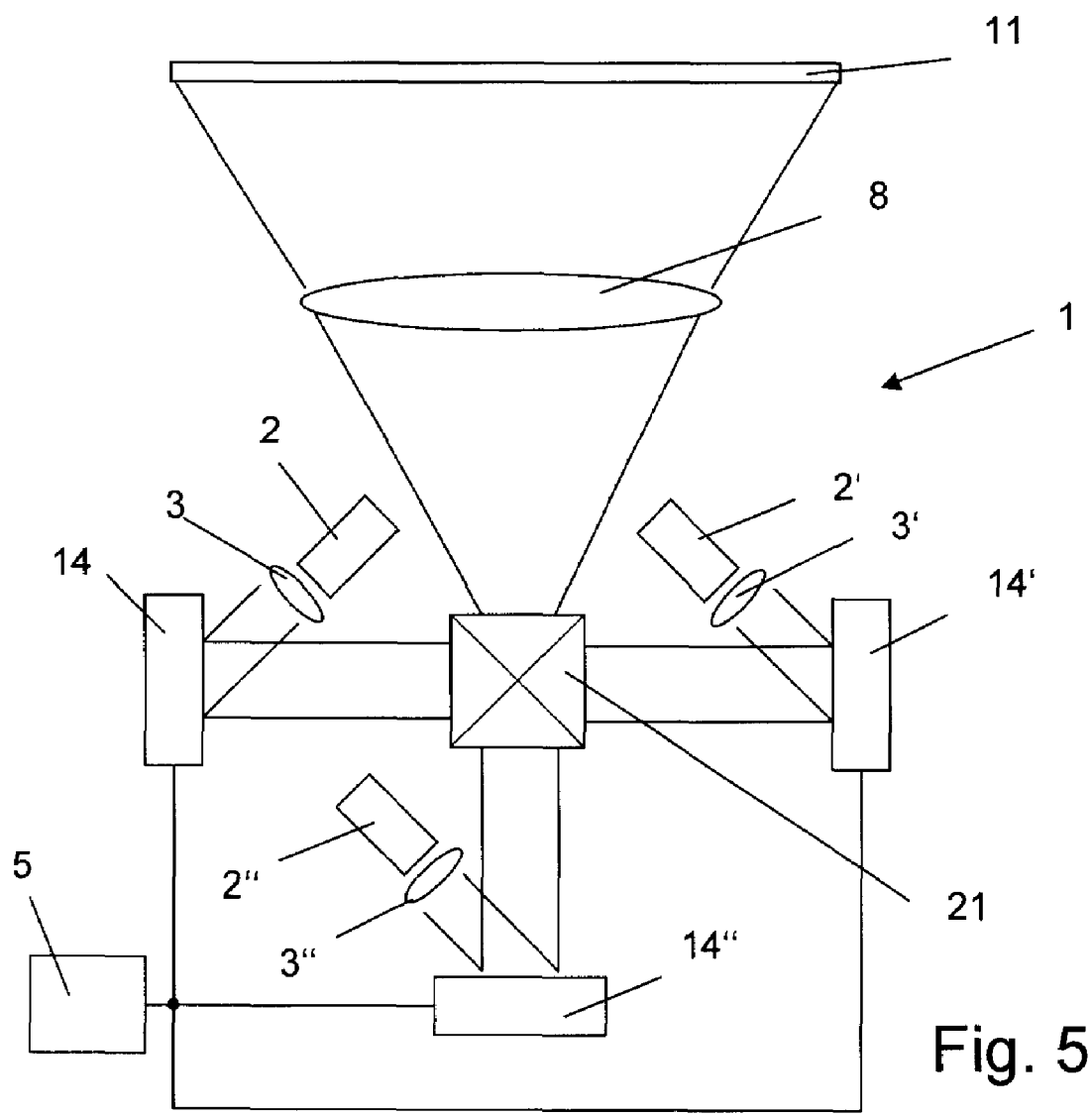
FIG. 5 shows yet another alternative embodiment of a colored display.

Also, the embodiment of the display apparatus 1 depicted in FIG. 5 comprises a plurality of SLED devices 2, 2', 2" and dedicated collimation optics 3, 3', 3". In contrast to the embodiment of FIG. 4, the light modulating device is not of the transmission type but of the reflection type, similar to the one shown in FIG. 1. The light modulating device comprises three light modulating units 14, 14', 14", each operable to define a single color pre-image. The projection optics 8 is operable to image the three pre-images onto the projection surface in a manner that the three pre-images are superposed one on another so that a colored image covering the full gamut is created. The projection optics in the shown arrangement includes a dichroic (or, to be precise, trichroic) prism 21. The light modulating units 14, 14', 14" may, as illustrated, be spatially separated or may alternatively be arranged on a common carrier element.

In the previously shown embodiments the SLED devices were shown as single devices separate from each other, each, for example, with its own contact means for supplying an appropriate current and each, for example, with its own casing (if any). This need not be the case. Rather, multiple SLEDs can be integrated and, for example, be arranged on a common substrate. Such monolithically integrated SLEDs may be essentially identical (all emit the same color) or may include layers of different semiconductor material compositions so that they emit at different wavelengths. For example, a red, green, and blue SLED may be on a common substrate and may constitute a multicolor light source as used for the embodiments of FIGS. 4 and 5 or other multicolor display embodiments of the invention.

Figure 6:
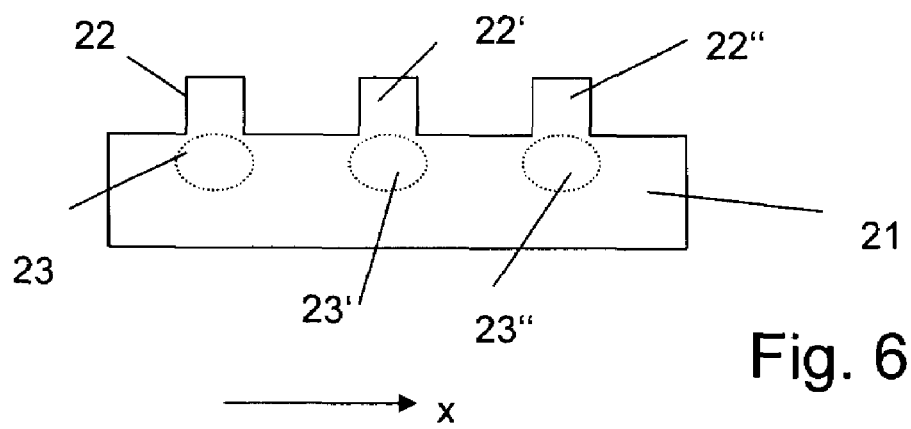
FIG. 6 shows a scheme of a monolithic multicolor SLED light source.

FIG. 6 very schematically illustrates an example of a light source in which a plurality of SLED devices is integrated on a common substrate. The three SLEDs are defined waveguides formed by ridges 22, 22', 22". In case the three SLEDs emit light of different spectral compositions, the layer structure (not shown) forming the necessary PN junction is horizontally structured, i.e. comprises regions of different material compositions or potentially a composition gradient as a function of the "horizontal" (i.e. perpendicular to the layers) position (of the x position in the illustrated embodiment). Such horizontal structuring may be achieved by means of masks or other means as such known in the art for structuring semiconductor devices. The three light fields 23, 23', 23" (for example of the red, green and blue light) formed under the ridges are also illustrated in the Figure.

With reference to FIGS. 7-9 very schematically different set-ups including an apparatus according to the invention are illustrated.

FIG. 7 illustrates a front projection system where an apparatus according to the invention 31 that incorporates the projection optics comprises a casing and is a possibly transportable device with a single power cable input and power supply unit (not illustrated), and further comprising a data interface for video data to be supplied to the electronic control. The front projection apparatus may, for example, be used as a video or data projector.

FIG. 8 illustrates a rear projection system where an apparatus according to the invention includes the projection surface 33. The projection surface includes a diffuser of light incident from the rear side. Often, the light emitted by a projection unit 31 that includes the light source and light modulating device as well as some optics is re-directed within the apparatus by re-directing and imaging means 32 that may include an appropriate number of mirrors, lenses and other passive optical components. An apparatus of the kind depicted in FIG. 8 may, for example, be used as a color television set or a monitor.

In FIG. 9, a head-up display is illustrated very schematically, where the apparatus according to the invention is a projection unit 31 that includes the light source and light modulating device as well as some optics. The image is projected via an at least partially reflecting element 41—such as windshield, a transparent portion of safety glasses or other eyeglasses, a display surface or other—to the human eye 42. In such an embodiment, the imaging functionality of the projection unit 31 may be such as to image the desired image onto the at least partially reflecting element 41 so that the user sees the image when she/he focuses onto the element 41. As an alternative, the projection unit may include the functionality of a virtual retinal display (retinal scan display) device, where the displayed information is directly imaged onto the retina, so that the user does not have to focus on the screen but gets the impression that the image is located at a far distance (for example at infinite distance, so that the image is focused when the user focuses on objects that are far away, for example, while driving or flying.). The technique of a retinal scan display which can also be used in conjunction with reflecting elements 41 that are very close to the eye as such is known and will not be described in any more detail here.

Various other embodiments may be envisaged without departing from the scope and spirit of the invention.

What is claimed is:

1. A method of displaying an image, the method comprising the steps of:
   providing a semiconductor heterostructure with a waveguide;
   causing the semiconductor heterostructure to emit visible light and to amplify said visible light by stimulated emission, thereby creating a primary light beam in the waveguide;
   causing the light beam to be radiated away from the semiconductor heterostructure without any substantial light beam portions being fed back to the semiconductor heterostructure;
   modulating the light beam to yield a pre-image;
   imaging the pre-image onto a full area of the image; and
   wherein a plurality of pre-images is created simultaneously and wherein the pre-images are imaged onto the full area of the image thereby creating the image.

2. A display apparatus for projecting an image onto a projection object, the display apparatus comprising:
   a light source, said light source comprising at least one superluminescent light emitting diode,
   wherein the light source comprises a plurality of superluminescent light emitting diodes, said superluminescent light emitting diodes being operable to emit light having a center wavelength, the center wavelength of light emitted by at least two of said plurality of superluminescent light emitting diodes being different,
   the apparatus further comprising at least one light modulating device arranged in a beam path of a light beam emitted by said light source and operable to emit influenced light upon incidence of said light beam, the light modulating device being operatively connected to an electronic control, and
   the display apparatus further comprising a projection optics arranged in a beam path of said influenced light.

3. The display apparatus according to claim 2, wherein the light source is operable to emit at least two light beams having different center wavelengths, the two light beams differing in at least one of an emission angle and of a position.

4. The display apparatus according to claim 3, wherein the superluminescent light emitting diodes are separate from each other.

5. The display apparatus according to claim 3, wherein at least two of the superluminescent light emitting diodes are monolithically integrated and arranged on a common substrate.

6. The display apparatus according to claim 2, wherein the light modulating device comprises a plurality of light modulating units arranged at different positions, wherein light emitted by a first one of said superluminescent light emitting diodes impinges on a first one of said light modulating units and wherein light of a second one of said superluminescent light emitting diodes impinges on a second one of said light modulating units, the first and second superluminescent light emitting diodes having different emission spectra.

7. The display apparatus according to claim 6, wherein each light modulating unit is operable to modulate incoming light so as to obtain a pre-image that is imaged, by a projection optics onto a full area of the image.

8. The display apparatus according to claim 6, comprising exactly three light modulating units operable to define pre-images for a red, a green, and a blue portion of the image, respectively.

9. The display apparatus according to claim 8, wherein the light source comprises exactly three superluminescent light emitting diodes, and wherein light emitted by a first one of said superluminescent light emitting diodes impinges on a first one of said light modulating units, light emitted by a second one of said superluminescent light emitting diodes impinges on a second one of said light modulating units, and light emitted by a third one of said superluminescent light emitting diodes impinges on a third one of said light modulating units.

10. The display apparatus according to claim 2, wherein the light modulating device is based on one of the mechanisms of a Digital Micro Mirror Device (DMD) mechanism, a Grating Light Valves mechanism, a Liquid Crystal Displays (LCDs) mechanism, or an Electrically Switchable Bragg Gratings (ESBGs) mechanism.

11. The display apparatus according to claim 2, wherein light paths from at least two of said superluminescent light emitting diodes of different emission spectra converge at a same light modulating unit area of the light modulating device, and wherein the light modulating device is operable to be operated in a time-division multiplexing.

12. The display apparatus according to claim 11, wherein the light modulating device comprises exactly one light modulating unit, a light modulating unit area of which is imaged by a projection optics onto a full area of the image.

13. The display device according to claim 2, being at least one of:
    A rear projection display;
    A front projection system;
    A pocket projector;
    An integrated display; and
    A head up display.

14. A light source for a display apparatus, the light source comprising:
    a first superluminescent light emitting diode comprising:
       a first semiconductor heterostructure forming a PN junction
       and a first waveguide defining an optical beam path,
       the heterostructure including a gain region and a contact for applying a voltage to the PN junction in the gain region, so as to produce light emission from the gain region and along the optical beam path,
       the first superluminescent light emitting diode having a first emission spectrum a central wavelength of which is in the visible part of the optical spectrum,
    the light source further comprising a second superluminescent light emitting diode comprising:
       a second semiconductor heterostructure forming a PN junction,
       and a second waveguide defining an optical beam path,
       the second heterostructure including a gain region and a contact for applying a voltage to the PN junction in the gain region, so as to produce light emission from the gain region and along the optical beam path,
       the second superluminescent light emitting diode having a second emission spectrum a central wavelength of which is in the visible part of the optical spectrum, and the second emission spectrum being different from the first emission spectrum.

15. A method of displaying an image, the method comprising the steps of:
- providing a semiconductor heterostructure with a waveguide;
- causing the semiconductor heterostructure to emit visible light and to amplify said visible light by stimulated emission, thereby creating a primary light beam in the waveguide;
- causing the light beam to be radiated away from the semiconductor heterostructure without any substantial light beam portions being fed back to the semiconductor heterostructure;
- modulating the light beam to yield a pre-image;
- imaging the pre-image onto a full area of the image; and
- comprising the additional step of generating, in a time-division multiplexing manner, a plurality of pre-images, wherein all pre-images are imaged onto the full area of the image thereby creating the image.

* * * * *